United States Patent
Sakai et al.

(10) Patent No.: US 6,771,842 B1
(45) Date of Patent: Aug. 3, 2004

(54) DOCUMENT IMAGE SKEW DETECTION METHOD

(75) Inventors: Kenichiro Sakai, Kawasaki (JP); Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 629 days.

(21) Appl. No.: 09/665,158

(22) Filed: Sep. 19, 2000

Related U.S. Application Data

(63) Continuation of application No. PCT/JP99/02219, filed on Apr. 26, 1999.

(30) Foreign Application Priority Data

May 28, 1998 (JP) ............................................ 10-147822

(51) Int. Cl.[7] ................................................. G06T 3/60
(52) U.S. Cl. ........................ 382/290; 382/176; 382/194; 358/488
(58) Field of Search .......................... 358/488; 382/290, 382/176, 194

(56) References Cited

U.S. PATENT DOCUMENTS

| | | | | |
|---|---|---|---|---|
| 4,558,461 A | * | 12/1985 | Schlang | 382/9 |
| 4,866,784 A | * | 9/1989 | Barski | 382/46 |
| 5,001,766 A | * | 3/1991 | Baird | 382/46 |
| 5,506,918 A | * | 4/1996 | Ishitani | 382/289 |
| 5,579,414 A | * | 11/1996 | Fast et al. | 382/254 |
| 5,845,010 A | * | 12/1998 | Silverbrook et al. | 382/232 |

FOREIGN PATENT DOCUMENTS

| | | | | |
|---|---|---|---|---|
| JP | 58-123169 | 7/1983 | ............ | G06K/9/36 |
| JP | 64-28791 | 1/1989 | ............ | G06K/9/20 |
| JP | 2-253383 | 10/1990 | ............ | G06F/15/70 |
| JP | 7-141465 | 6/1995 | ............ | G06K/9/32 |
| JP | 7-192086 | 7/1995 | ............ | G06K/9/32 |

* cited by examiner

*Primary Examiner*—Leo Boudreau
*Assistant Examiner*—Dennis Rosario-Vasquez
(74) *Attorney, Agent, or Firm*—Staas & Halsey LLP

(57) ABSTRACT

A method for detecting a skew of a document image corrects the skew of a document image input from an image scanner, and achieves increased accuracy compared with prior art document image skew detection methods. After segmenting the input document image into regions each having a predetermined width, lines containing black pixels are detected from each of these regions. Then, from a region where the detected lines containing black pixels follow one another in a consecutive manner, a partial image is extracted, the skew angle of the partial image is detected, and the skew angle of the document image is determined based on the thus detected skew angle of the partial image.

8 Claims, 10 Drawing Sheets

$W \times \sin\theta < D$

HEIGHT H

HEIGHT H

DOCUMENT IMAGE SKEW DETECTION METHOD

CROSS-REFERENCE TO RELATED APPLICATIONS

This application is based upon and claims priority of Japanese Patent Application No. 10-147822, filed May 28, 1998, the contents being incorporated herein by reference, and a continuation of PCT/JP99/02219 filed Apr. 26, 1999.

TECHNICAL FIELD

The present invention relates to a document image skew detection method for detecting a skew of an image (particularly, a document image) input from an image input device such as an image scanner.

BACKGROUND ART

Image scanners have been used for many years as devices for inputting document images. Conventionally, desktop scanners, generally known as flatbed scanners, have been used, but in recent years, the development and commercialization of manually operated hand-held scanners compact in size and convenient to carry around have been proceeding.

With such hand-held scanners, the probability of scanning a document image askew is very high, depending especially on the way that the user operates the scanner. Ideally, the scanner should be moved over the document in a direction parallel or perpendicular to the direction of text orientation. This should prevent the input document image from being scanned askew.

In reality, however, since the hand-held scanner allows great freedom in user operation, the probability that the user will scan the document by holding the scanner askew to the orientation of the text is very high. This could happen regardless of whether the user is aware of it or not. When the scanner is moved askew to the document, the document image is also scanned askew.

To solve this problem, the following techniques have been proposed in the prior art.

Japanese Unexamined Patent Publication No. 63-180180 discloses a technique whereby each side of a rectangle bounding the text area of a document image is obtained by a straight-line approximation based on the scanned document image. Then, the angle between the thus obtained straight line (side) and the outer periphery of the image is computed, and this angle is taken to represent the skew of the document image.

Japanese Unexamined Patent Publication No. 7-192086 discloses a technique whereby, from a plurality of scanned document images, points defining a boundary between black and white pixels on the image are extracted and a straight regression line representing these extracted points is computed. The skew angle of the document image can be found from the values of the regression coefficients of the thus computed straight regression line.

Japanese Unexamined Patent Publication No. 7-282195 discloses a technique which creates a projection profile by accumulating the number of black pixels for each line of the input document image. The skew angle can be found from the variance in the thus created projection profile.

The above techniques then correct the skew of the document by rotating the input document image in a direction that offsets the skew in accordance with the calculated skew angle of the document.

These techniques, however, involve the following problems.

For example, when a portion of a document is scanned by a scanner, characters will be present over the entire image area scanned. Especially, in the case of hand-held scanners which are made compact in size, the width that they can scan at a time is small, which quite often leads to a situation where only a portion of a document can be scanned. In such cases, the rectangular area bounding the text area of the image coincides with the outer periphery of the scanned image. With the technique disclosed in Japanese Unexamined Patent Publication No. 63-180180, therefore, if the document is scanned as described above, the skew image of the document image cannot be obtained based on the angle that each side of the rectangle bounding the text area makes with the outer periphery of the image.

On the other hand, when the document image contains not only characters but also graphics such as line drawings or photos, the boundary between the black and white pixels in the graphic image portion is not a straight line. As a result, the slope angle of the straight regression line of the boundary does not represent the skew angle of the document image. Accordingly, with the technique disclosed in Japanese Unexamined Patent Publication No. 7-192086, which calculates the skew of the document image based on the slope of the straight-regression line taken along the boundary points between the black and white pixels in an image area, the probability of erroneously calculating the skew angle increases greatly if the document image also contains graphics.

Further, in the case of a document image containing graphics, when calculating the skew angle of the document by creating a projection profile of the document image, if there is a graphic that differs in density from the document image (text area), it is likely that the distribution of the entire projection profile containing such graphics will differ from the projection profile of the document image. Accordingly, the technique disclosed in Japanese Unexamined Patent Publication No. 7-282195 cannot address such a problem.

DISCLOSURE OF THE INVENTION

In view of the above-outlined problems, it is an object of the present invention to provide a document image skew detection method capable of detecting the skew angle of a document with high accuracy even when only a portion of the document image is scanned or when the document image contains graphics.

To achieve the above object, according to the present invention, there is provided a method for detecting a skew of a document image, comprising the steps of: segmenting an input document image into segmentation regions each having a predetermined width; detecting a region formed from consecutive lines containing black pixels as a consecutive-line region from within each of the segmentation regions; extracting the detected consecutive-line region as a partial image based on a predetermined condition; calculating the skew angle of the partial image; and determining the skew angle of the document image based on the calculated skew angle of the partial image.

According to the present invention, preferably, the step of calculating the skew angle of the partial image includes: setting coordinate axes for the partial image; approximating the coordinates of the black pixels present in the sub-region by a straight line; and taking the slope of the approximated straight line to represent the skew angle of the partial image.

According to the present invention, preferably, the step of extracting the partial image includes: calculating the ratio of the number of black pixels to the number of pixels within the consecutive-line region; and extracting the consecutive-line region as the partial image if the number of black pixels lies within a preset range.

According to the present invention, preferably, the step of extracting the partial image includes: determining whether the height of the consecutive-line region lies within a preset height range; and extracting the consecutive-line region as the partial image if it is determined that the height of the consecutive-line region lies within the preset range.

According to the present invention, preferably, the step of extracting the partial image includes; finding the width of an area, within the consecutive-line region, where there are no contiguous black pixels along the direction of the lines; comparing the width of the no-black-pixel area with a preset width; and extracting the consecutive-line region as the partial image if the result of the comparison shows that the width of the area is smaller than the preset width.

According to the present invention, preferably, the step of detecting the consecutive-line region includes detecting a plurality of consecutive-line regions, the step of extracting the partial image includes extracting a plurality of partial images, the step of calculating the skew angle of the partial image includes calculating the skew angle for each of the plurality of partial images, and the step of determining the skew angle of the document image includes determining the skew angle of the document image based on the calculated skew angles of the plurality of partial images.

According to the present invention, preferably, the step of determining the skew angle of the document image includes: counting skew angle information classified according to the sign of the skew angle calculated for each of the plurality of partial images; and determining the skew angle of the document image based on the skew angle information of whichever sign resulted in a greater count.

According to the present invention, preferably, the step of determining the skew angle of the document image includes: obtaining an average value of the skew angles of the plurality of partial images; and determining the average value as the skew angle of the document image.

According to the present invention, preferably, the step of determining the skew angle of the document image includes: calculating the angle of a diagonal of the extracted partial image; comparing the angle of the diagonal with the skew angle of the partial image; and determining the skew angle of the document image based on the skew angle of the partial image if the skew angle of the partial image is smaller than the angle of the diagonal.

BEST MODE FOR CARRYING OUT THE INVENTION

An embodiment of the present invention will be described below with reference to drawings.

Figure 1A:
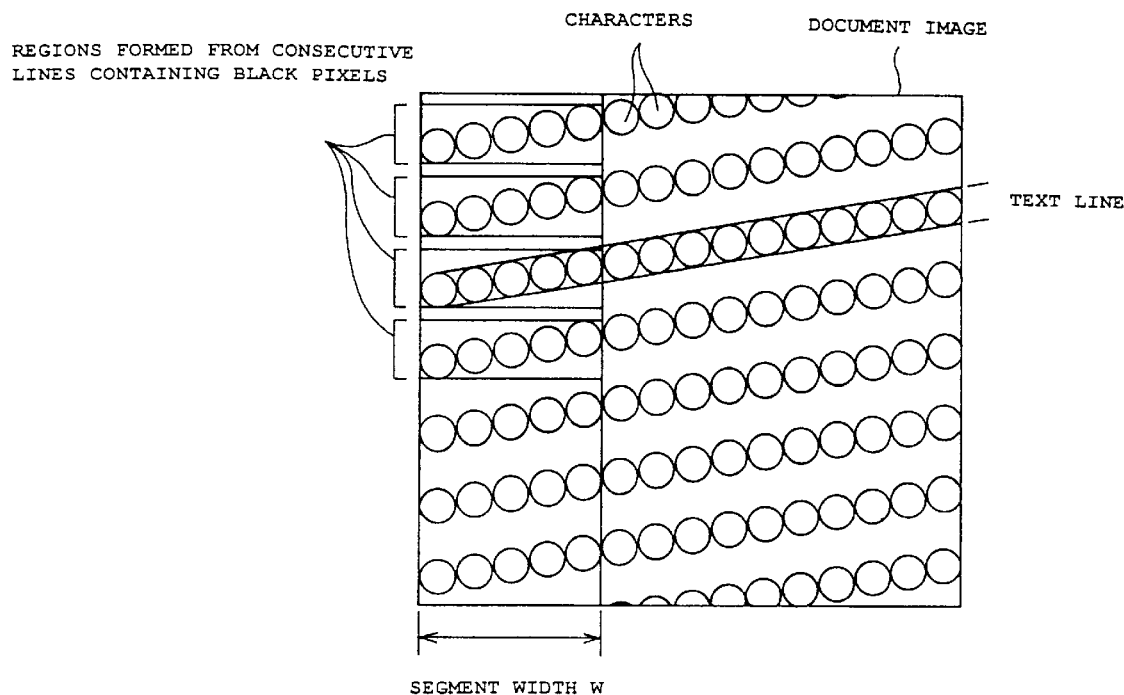
FIG. 1A is a schematic diagram showing an example of a document image scanned askew.

FIG. 1A is a schematic diagram showing a document image scanned by an image scanner. Each circle in the figure indicates a character. The text in the document image shown in FIG. 1A is written horizontally; it is assumed here that the document is scanned with each text line tilted upward to the right.

As can be seen, the characters in the skewed document image are lined up on a straight line whose slope angle is identical with the skew angle of the document image, that is, the slope angle of each text line in the document is the same as the skew angle of the document image. Focusing attention on this point, the present embodiment employs a configuration in which a portion of a text line is extracted as a partial image from a document image and the skew angle of the document image is detected by finding the skew of this partial image.

More specifically, the document image is segmented into regions (called segmentation regions) each having a predetermined segment width W. In the example of FIG. 1A, since the text is written horizontally, the document image is segmented along a vertical direction. This reason and others will be described in detail later.

Figure 1B:
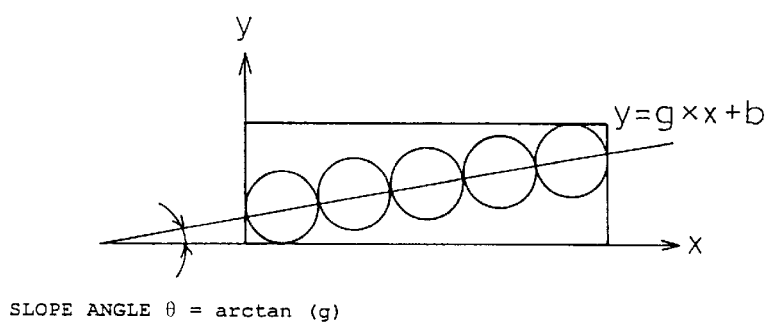
FIG. 1B is a diagram showing an example of a partial image extracted from the document image.

Next, in each region with the segment width W, a region formed from consecutive lines containing black pixels (hereinafter called a consecutive-line region) is detected (in this case, in the direction of text lines). Then, if the region satisfies specific conditions, it is determined that the region represents an image of a portion of a text line, and the region is extracted as a partial image as shown in FIG. 1B. The term "black pixels" here refers to the pixels forming a character, regardless of the actual color of the pixels. Accordingly, in the case of a document carrying white characters printed on a black background, the white pixels contained in the character region are regarded as "black pixels". Further, when a color document is scanned using a color scanner, the document is read by being decomposed into three color components RGB; in this case also, the pixels forming characters are regarded as "black pixels".

The horizontal direction of the extracted partial image is taken as the x axis and the vertical direction as the y axis, and the coordinates of the black pixels within the partial image are approximated by a straight line. Then, the slope, g, of the approximated straight line is calculated. The slope, g, of the approximated straight line can be calculated from the following equation, for example, as the slope of the straight regression line representing the coordinates of the black pixels.

$$g=(N\Sigma x_i y_i - \Sigma x_i \Sigma y_i)/[N\Sigma x_i^2 - (\Sigma x_i)^2] \qquad (1)$$

Here, $\Sigma$ denotes summation from i=0 to i=N−1, where N is the number of black pixels within the partial image, and $x_i$ and $y_i$ are x and y coordinates of the i-th black pixel.

Then, from the slope, g, of the approximated straight line, the slope angle $\theta$ of the straight line can be obtained from the relation $$\theta = \tan^{-1} g \qquad (2)$$

Here, if the number of partial images used is limited to one, the correct skew of the document may not be obtained due to straight-line approximation errors, etc. It is therefore desirable that a plurality of partial images be extracted and the slope of the straight line in each partial image be obtained. Then, the skew of the document can be determined with high accuracy if the skew of the document image is calculated based on the skew angles of all the extracted partial images.

Figure 2:
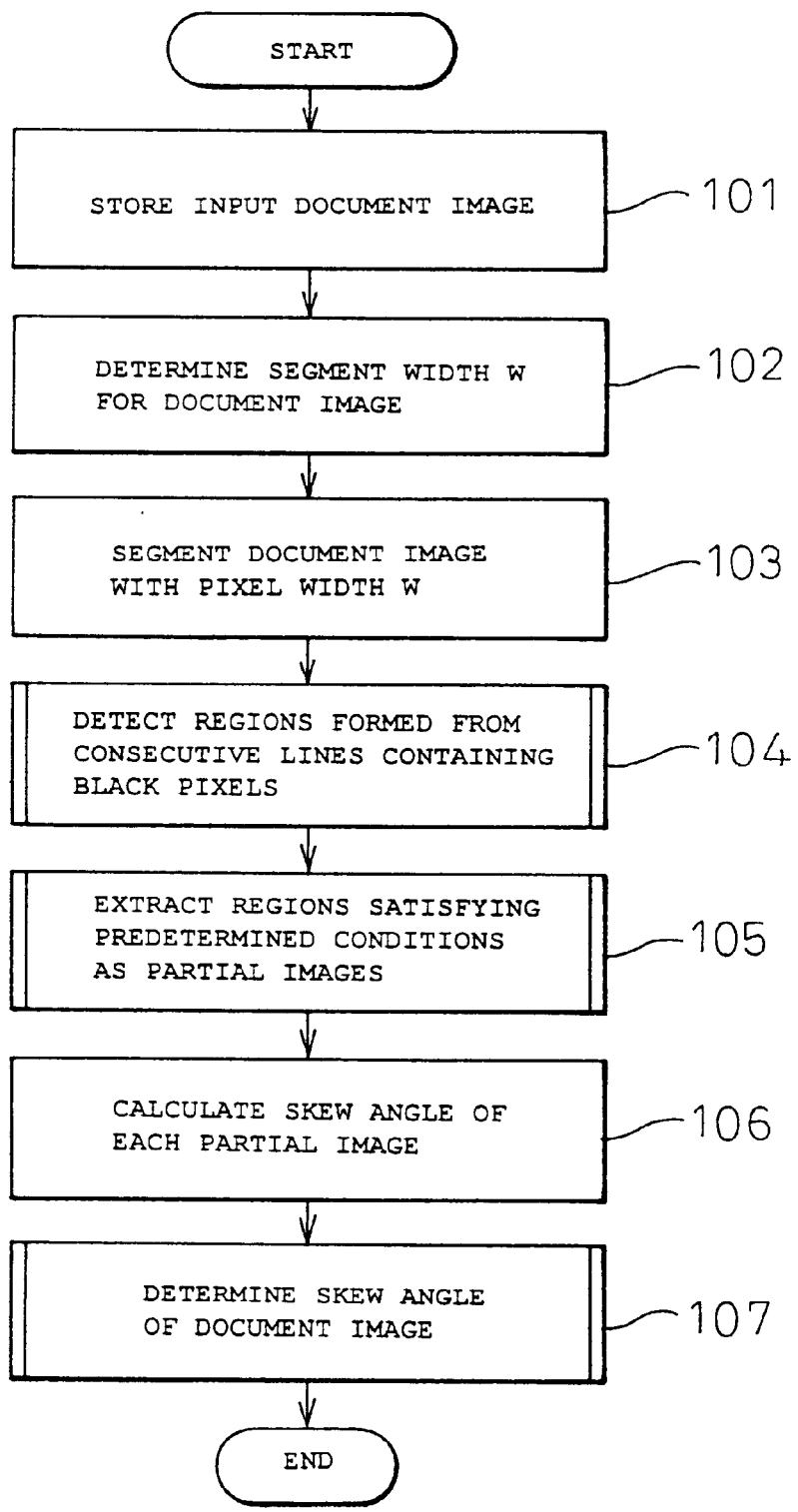
FIG. 2 is a flowchart illustrating a process for document image skew detection according to one embodiment of the present invention.

FIG. 2 is a flowchart illustrating a skew angle detection process according to the present embodiment. The general process flow is shown here.

First, a document image input from a scanner or the like is temporarily stored in a memory (step 101). Next, the segment width W with which to segment the input document image is determined based on the resolution and other settings of the scanner (step 102).

Figure 3:
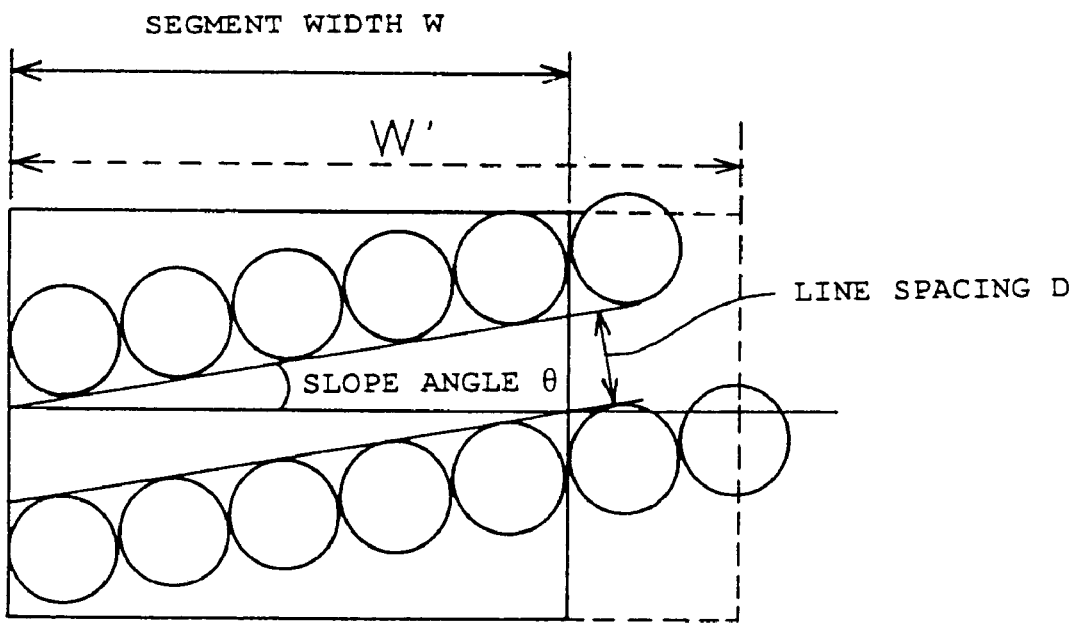
FIG. 3 is a diagram showing a method of calculating segment width W.

The width W with which to segment the document image is calculated from the relationship shown in FIG. 3. That is, w satisfies the relation $$W \times \sin \theta < D \qquad (3)$$

and is selected as the segment width, where W is the segment width, D is the number of pixels defining text line spacing in the document image, and $\theta$ is the maximum angle used for the detection of skew.

For example, if the segment width is set to W' shown in FIG. 3 without changing $\theta$ and D, black pixels on the upper and lower lines will be detected continuously, and the upper and lower lines cannot be separated along the horizontal direction. It is therefore extremely important that the document be segmented with the segment width W defined by the above relationship.

For the same line spacing, if the maximum detection angle is increased, the segment width W should be reduced. However, as the segment width W decreases, the straight line used for skew detection becomes short. When performing the straight line approximation, this could result in an increased error between the slope of the straight line obtained by the approximation and the actual slope of the text line, degrading the accuracy of the skew detection.

On the other hand, if the segment width W is increased, the error between the slope of the approximated straight line and the actual slope of the text line is reduced. This, however, could lead to a situation where the upper and lower lines cannot be separated, and if the segment width W is set too large, there arises the possibility that the maximum detectable skew angle may become very small.

When a manually operated hand-held scanner is considered, the angle between device orientation and document orientation would usually fall within about 10 degrees. In view of this, if the segment width W is set so that a skew angle up to about 10 degrees can be detected, a good balance can be achieved between the skew detection accuracy and the maximum detectable skew angle.

Further, if the same document image is scanned, the number of pixels defining the line spacing differs depending on the resolution of the scanner or the like. For example, the number of pixels between lines of text, when scanned at 400 dpi, is twice the number of pixels when scanned at 200 dpi. Accordingly, the resolution of the scanner must be taken into account when setting the segment width W.

When performing image reading using a scanner, the resolution of the scanner is set ahead of time. To set the segment width W, therefore, the segment width W is determined based on this preset resolution of the scanner. In other words, the segment width W is changed according to the scanner resolution. The input image can then be segmented with a proper width, whatever the resolution setting.

Based on the thus determined segment width W, the document image is segmented with the pixel width W (step 103).

Next, in each of the regions (segmentation regions) segmented with the segment width W, regions (consecutive-line regions) formed from consecutive lines containing black pixels are detected (step 104).

Figure 4:
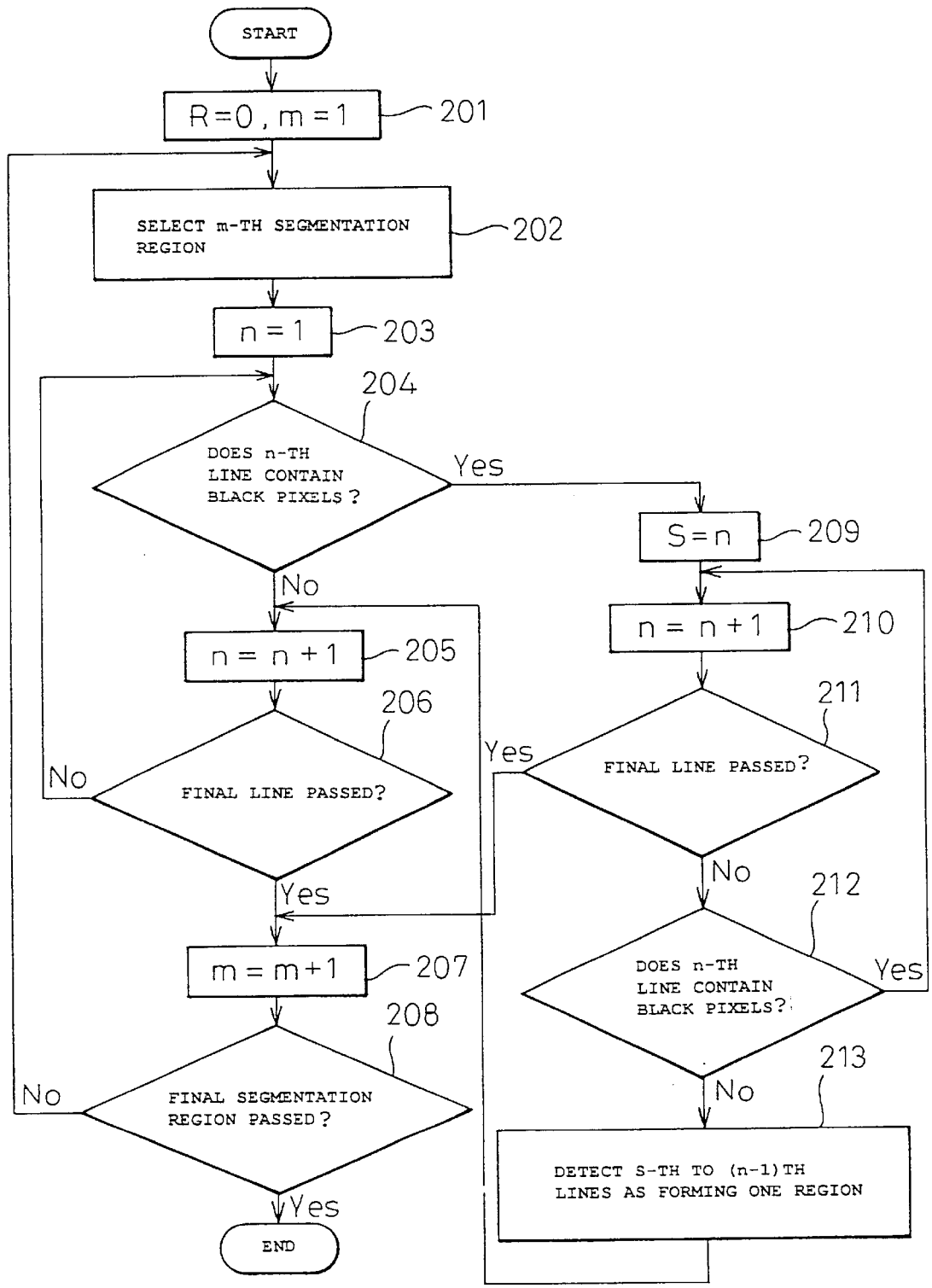
FIG. 4 is a flowchart illustrating a process for detecting regions formed from consecutive lines containing black pixels.

The region detection process will be described in detail with reference to FIG. 4 which illustrates the details of the processing carried out in step 104. In FIG. 4, R represents the number of consecutive-line regions detected and m is a number designating, in sequence, each segmentation region selected from the regions formed by the segmentation in step 103. Further, n is the line number starting from the top of each segmentation region, and S indicates the starting position of the lines containing black pixels.

When the process starts, first R is set to 0 and m to 1 (step 201). Then, the m-th segmentation region is selected (step 202). Initially, the first segmentation region is selected. Next, n is set to 1, that is, the line number is set to point to the first line number in the m-th segmentation region (step 203).

After setting the line number, it is determined whether the n-th line contains black pixels (step 204). If it contains black pixels, processing in step 209 is carried out, but if it does not contain any black pixels, the processing in step 205 is carried out.

If no black pixels are detected in step 204, n is incremented to n+1 (step 205). Then, it is determined whether the final line in the m-th segmentation region is passed or not (step 206). If the final line is not passed yet, the processing in step 204 is repeated.

On the other hand, if it is determined in step 206 that the final line is passed, m is incremented to m+1 (step 207). Then, it is determined whether the final segmentation region is passed or not (step 208). If the final segmentation region is not passed yet, the processing from step 202 is repeated. On the other hand, if it is determined in step 208 that the final segmentation region is passed, the process is terminated.

If it is determined in step 204 that the n-th line contains black pixels, S is set equal to n in step 209. Next, n is incremented to n+1 (step 210). After that, in step 211, it is determined whether the final line is passed or not. If the final line is passed, the processing in step 207 is carried out. On the other hand, if it is determined that the final line is not passed yet, it is determined in step 212 whether the n-th line contains black pixels. If it is determined that the n-th line contains black pixels, the processing from step 210 is repeated. On the other hand, if it is determined in step 212 that the n-th line does not contain any black pixels, the S-th to (n−1)th lines are detected as forming one region (consecutive-line region), and R is incremented to R+1 (step 213). Then, the process proceeds to carry out the processing from step 205.

By repeating the above process for all the segmentation regions, the regions (consecutive-line regions) formed from consecutive lines containing black pixels, and the number, R, of them, can be obtained.

Figure 5:
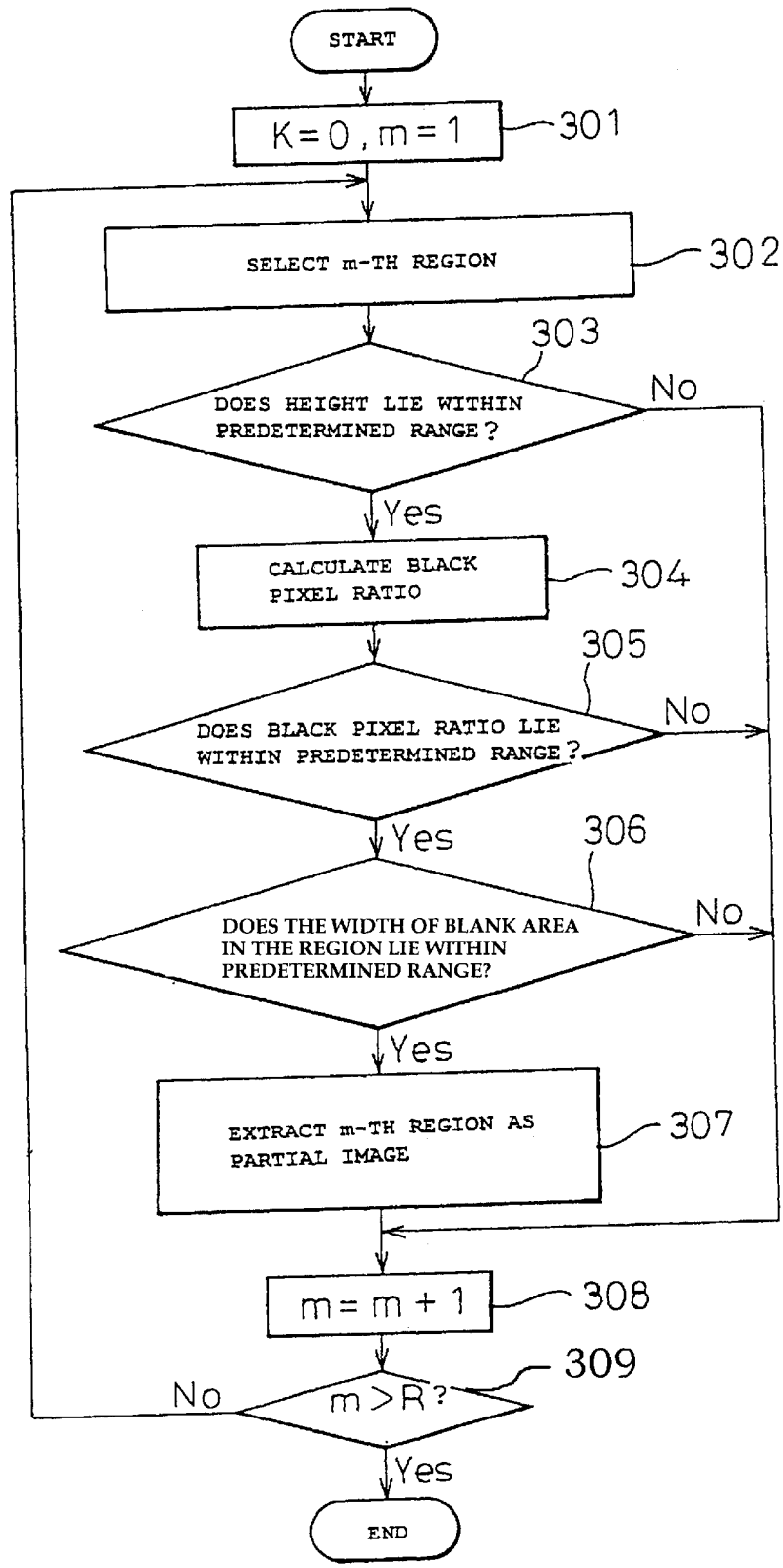
FIG. 5 is a flowchart illustrating a process for extracting partial images.

After carrying out the processing in step 104, the process proceeds to extract a consecutive-line region satisfying predetermined conditions as a partial image (step 105). FIG. 5 is a flowchart illustrating the processing in step 105 in further detail. In FIG. 5, K represents the number of partial images extracted as the result of the processing in FIG. 5, m is the number designating in sequence each region selected from among the regions (consecutive-line regions) detected in the process of step 104, and R indicates the number of regions extracted in the process of step 104.

When the processing in step 105 is initiated, first K is set to 0 and m to 1 (step 301). Then, in step 302, the m-th region is selected. Next, it is determined in step 303 whether the height of the selected m-th region lies within a predetermined range. This processing is performed to exclude regions with extremely small heights or extremely large heights such as shown in FIGS. 6A and 6B.

Figure 6A:
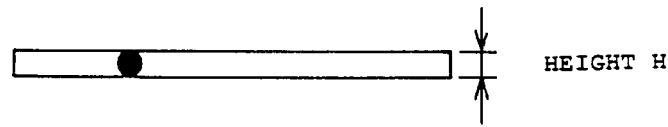
FIGS. 6A and 6B are diagrams showing, respectively, an example of a region with a small height and an example of a region with a large height.
Figure 6B:
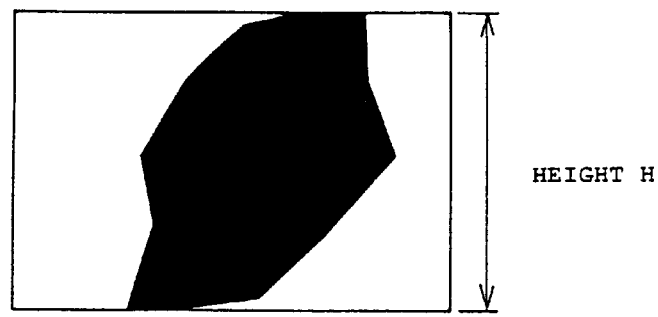

For example, a region with a small height such as image noise, as shown in FIG. 6A, or a region containing a subregion with a large height such as a portion of a drawing, as shown in FIG. 6B, is not a region containing characters. It is therefore desirable to exclude such regions from the regions used to discriminate the skew of the document image. To achieve this, upper and lower limit heights for the regions to be extracted are set based on the standard character height, and only regions having a height lying within these limits are extracted as partial images; with this arrangement, images other than characters can be prevented from being extracted.

If the same character is scanned, its size differs depending on the reading resolution of the document image. Considering this, the height range for the regions to be extracted is changed according to the resolution, so that only regions with a proper height can be extracted as partial images, whatever the resolution setting.

If it is determined in step 303 that the height of the selected region lies within the predetermined range, then the ratio of the black pixels to all the pixels contained in the selected m-th region, i.e., the black pixel ratio, is computed (step 304).

Figure 7A:
FIGS. 7A and 7B are diagrams showing, respectively, an example of a region with a high black pixel ratio and an example of a region with a low black pixel ratio.
Figure 7B:

After computing the black pixel ratio of the m-th region, it is determined whether the thus computed black pixel ratio lies within a predetermined range (step 305). This processing is performed to exclude regions with an extremely high black pixel ratio, such as the one shown in FIG. 7A, and also regions with an extremely low black pixel ratio, such as the one shown in FIG. 7B.

The image used for the detection of document image skew represents a portion of a text line containing characters. On the other hand, a region formed almost entirely from black pixels, such as the one shown in FIG. 7A, or conversely a region containing few black pixels, such as the one shown in FIG. 7B, can be regarded as a region other than a character region; therefore, it is not desirable to extract such regions for the detection of document image skew.

Therefore, considering the black pixel ratio, etc. in character images usually encountered, upper and lower limit values are imposed on the black pixel ratio for the regions to be extracted. If the black pixel ratio of the extracted region lies within the thus set limits of the black pixel ratio, the region can then be regarded as a character region. On the other hand, if the black pixel ratio of a region is outside the thus set limits of the black pixel ratio, the region can be regarded as a region other than a character region and, therefore, this region is not extracted.

If it is determined that the black pixel ratio is within the predetermined range, it is determined next whether the width of a blank area in that region lies within a predetermined range (step 306). This processing is performed to exclude regions in which the blank area occupies a substantial percentage, such as the one shown in FIG. 8.

Figure 8:
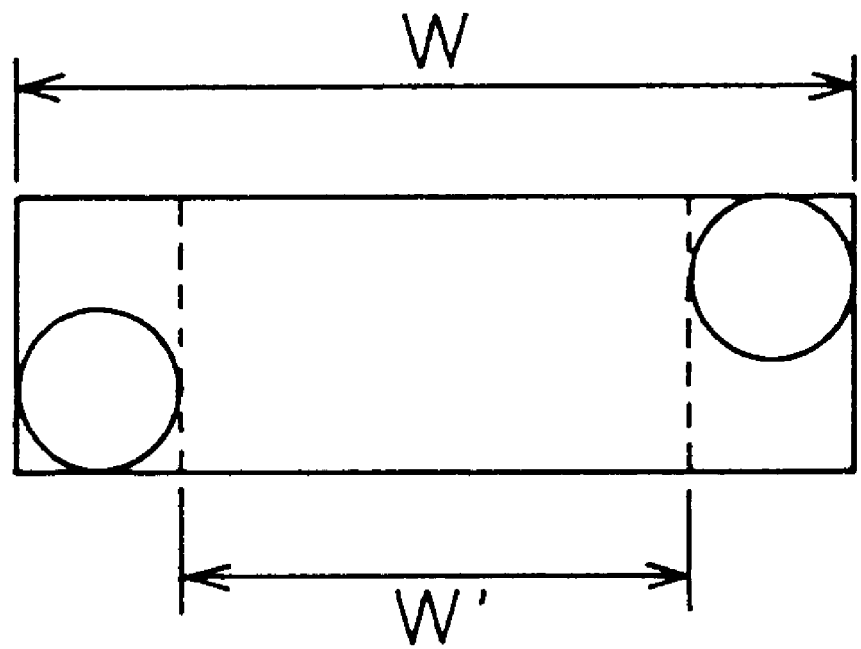
FIG. 8 is a diagram showing an example of a region in which a blank area occupies a substantial percentage of the region.

In a region where there is a large blank area between characters as shown in FIG. 8, the distribution of black pixels is unbalanced. If such a region is used, the skew angle may not be detected correctly. It is therefore not desirable to use such regions for the detection of the skew angle of the document image. In view of this, in the example of FIG. 8, the width W' of an area where there are no black pixels in the direction of the text line is found, and the ratio of W' to the segmentation region width W is calculated. If this ratio is larger than a preset ratio, that region is not extracted. Here, since the segmentation region width W is predetermined, the width W' which has a known ratio to W can also be predetermined. Therefore, it is also possible to make a decision, based directly on the value of W', as to whether the region is to be extracted or not.

If, as the result of the processing in step 306, it is determined that the width of the blank area in the region lies within the predetermined range, then the m-th region is extracted as a partial image, and K is incremented to K+1 (step 307). After that, in step 308, m is incremented to m+1. This allows the selection of the next region.

On the other hand, if the m-th region does not satisfy the predetermined condition in step 303, 305, or 306, the processing in step 308 is also carried out.

After the processing in step 308, it is determined in step 309 whether m exceeds R. That is, it is determined whether the process of FIG. 5 has been completed for all the regions detected in step 104. If there is any region remaining unprocessed, the process returns to step 302 to repeat the partial image detection process.

In this way, by performing the process of FIG. 5, regions highly likely to correspond to a portion of a text line are selectively extracted as partial images from among the regions selected in step 104.

Next, skew angle is calculated for each partial image extracted in step 105 (step 106). This can be calculated as shown in equation (1).

Figure 9:
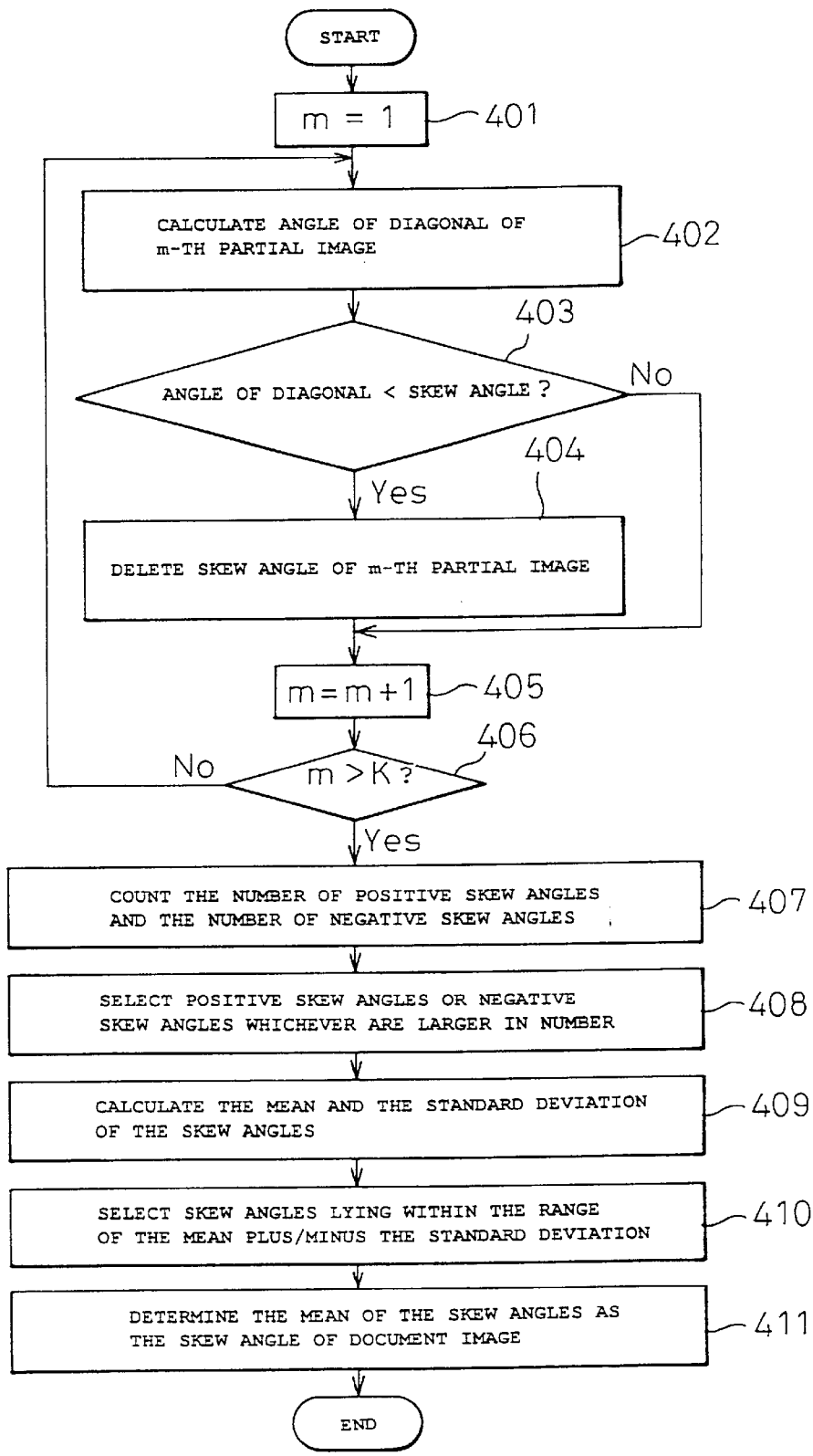
FIG. 9 is a flowchart illustrating a process for determining the skew angle of the document image.

After calculating the skew angle of each partial image in step 106, the skew angle of the document image is determined in step 107. FIG. 9 is a flowchart illustrating the processing in step 107 in further detail.

In FIG. 9, when the processing is initiated, first m is set to 1 (step 401). Here, m is a variable for specifying the partial image to be selected from among the partial images extracted in step 105 and the skew angle of the selected partial image. In FIG. 9, K represents the number of partial images extracted in step 105.

After step 401, the angle of a diagonal of the m-th partial image is calculated (step 402). Then, it is determined whether the angle of the diagonal of the partial image calculated in step 402 is smaller than the skew angle of the partial image.

Figure 10:
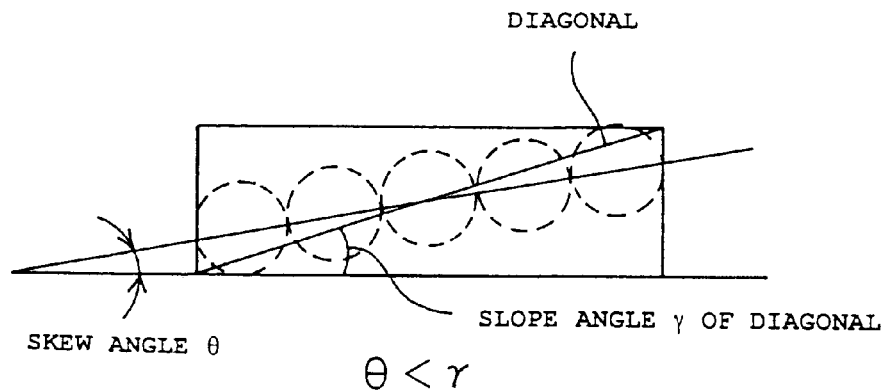
FIG. 10 is a diagram showing the relationship between a diagonal of a subregion and the skew.

As shown in FIG. 10, if the extracted region is an ordinary character region, the skew angle of the extracted partial image should always be smaller than the angle of the diagonal of the partial image. Conversely, if the calculated skew angle of the partial image is larger than the angle of the diagonal of the partial image, it may then be determined that the calculated skew angle of the partial image is in error. The accuracy of the skew angle detection can be enhanced by discarding the skew angle of the partial image if the skew angle is considered to be in error.

If, as the result of the determination in step 403, the angle of the diagonal is smaller than the skew angle, the skew angle of the m-th partial image is deleted by determining that the skew angle is in error (step 404), and m is incremented to m+1 to point to the next partial image (step 405). On the other hand, if it is determined in step 403 that the angle of the diagonal is larger than the skew angle of the partial image, the process proceeds to carry out the processing in step 405.

After step 405, it is determined whether m>K, to determine whether the processing from step 402 through step 405 has been completed for all the extracted partial images (step 406). If m is not larger than K, there is a partial image remaining unprocessed, and the processing from step 402 is repeated. On the other hand, if m>K, that means that the processing has been completed for all the partial images.

In the latter case, after step 406, the process proceeds to count the number of positive skew angles and the number of negative skew angles, respectively, from among the skew angles of the partial images (step 407).

Generally, when the skew angles of a plurality of partial images are obtained by calculation, the number of skew angles having the same sign as the actual skew angle of the original image should be larger than the number of skew angles having the sign opposite to it if there is a certain degree of error in the calculation results. In view of this, from among the calculated skew angles, the number of positive skew angles and the number of negative skew angles are respectively counted, and the skew angles of the positive or negative sign, whichever is larger in the number of skew angles, are retained, while discarding the skew angles of the other sign; in this way, the accuracy of the skew angle detection can be enhanced.

Based on the counted results of the skew angles, the positive skew angles or negative skew angles, whichever are larger in number, are selected (step 408).

After that, the mean and the standard deviation of the selected skew angles are calculated (step 409), and skew angles lying within the range of the mean plus/minus the standard deviation are selected (step 410). Then, the mean of the skew angles selected in step 410 is calculated, and is taken to determine the skew angle of the document image (step 411).

Since the mean of more than one skew angle is taken to determine the skew angle of the original document image, the skew angle of the document image can be calculated more correctly than when the skew angle of the document image is determined based on the skew angle of only one partial image.

Further, if the skew angle of a detected partial image deviates greatly from the mean angle, that angle may not represent the correct skew angle. In view of this, the standard deviation is found from the distribution of the calculated skew angles, then angles lying within the range of the mean skew angle plus/minus the standard deviation are selected, and the mean of the selected angles is taken as the skew angle of the document image; this serves to further enhance the detection accuracy of the skew angle of the document image.

By carrying out the above process, the skew angle of the document image can be obtained. The correction of the document image can be accomplished by rotating the document image by the same angle as the thus obtained skew angle but in the opposite direction.

The above description has been given assuming that the document is written horizontally. However, in the case of a document image representing vertically written text or rotated by 90 degrees, if the image is segmented along the vertical direction, a portion of a text line cannot be extracted as a document image from segmentation regions. In such cases, the document image is segmented along the horizontal direction, as shown in FIG. 11, and regions containing contiguous black pixels are detected from among the segmented partial images; then, the skew can be detected using the same method as described above.

If the text orientation of the document image is unknown, the skew angle detection is performed in both the horizontal and vertical directions. Then, the skew angle in the direction along which the larger number of partial images were extracted is taken as the skew angle of the document image.

Figure 11:
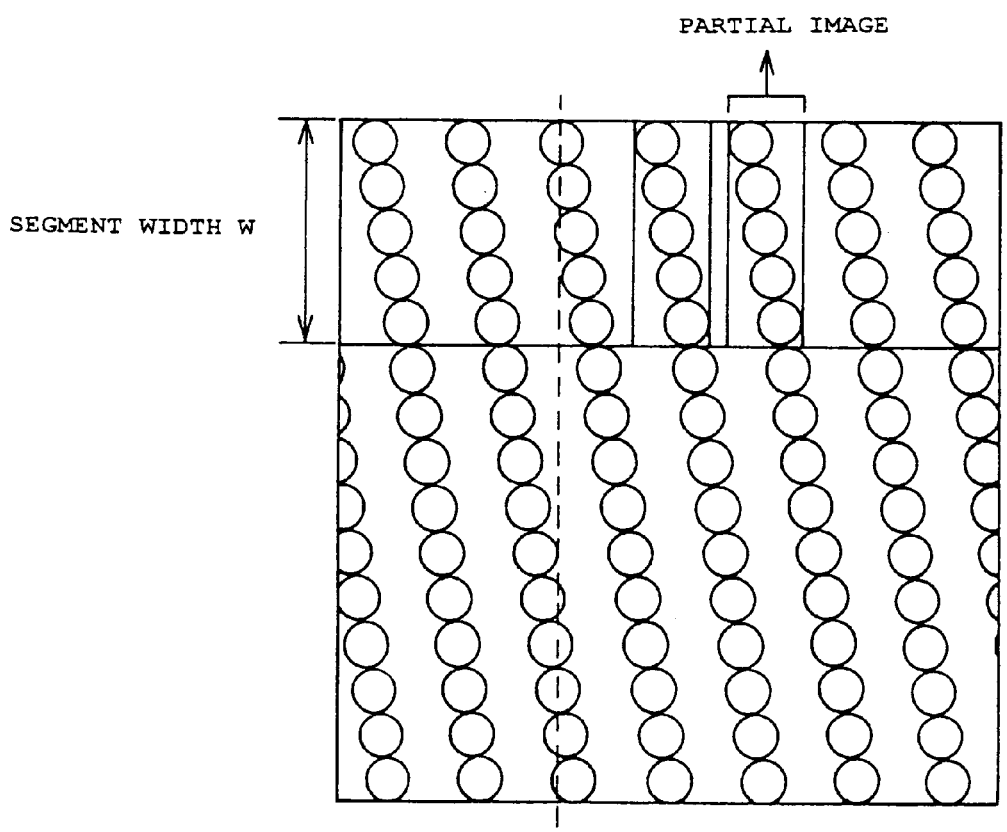
FIG. 11 is a diagram for explaining an example of extracting a partial image from a vertically written document image.

When segmenting a document image with a certain segment width and detecting regions containing contiguous black pixels from the segmented images, if the document image is segmented along the direction perpendicular to the direction of text lines, a portion of each text line can be detected as an independent region, as shown in FIG. 11. On the other hand, if the document image is segmented along the same direction as the direction of text lines, a plurality of text lines are detected as forming one region, as shown by a dashed line in FIG. 11. Accordingly, when the document image is segmented along the direction perpendicular to the direction of text lines, a larger number of partial images can be extracted.

Figure 12:
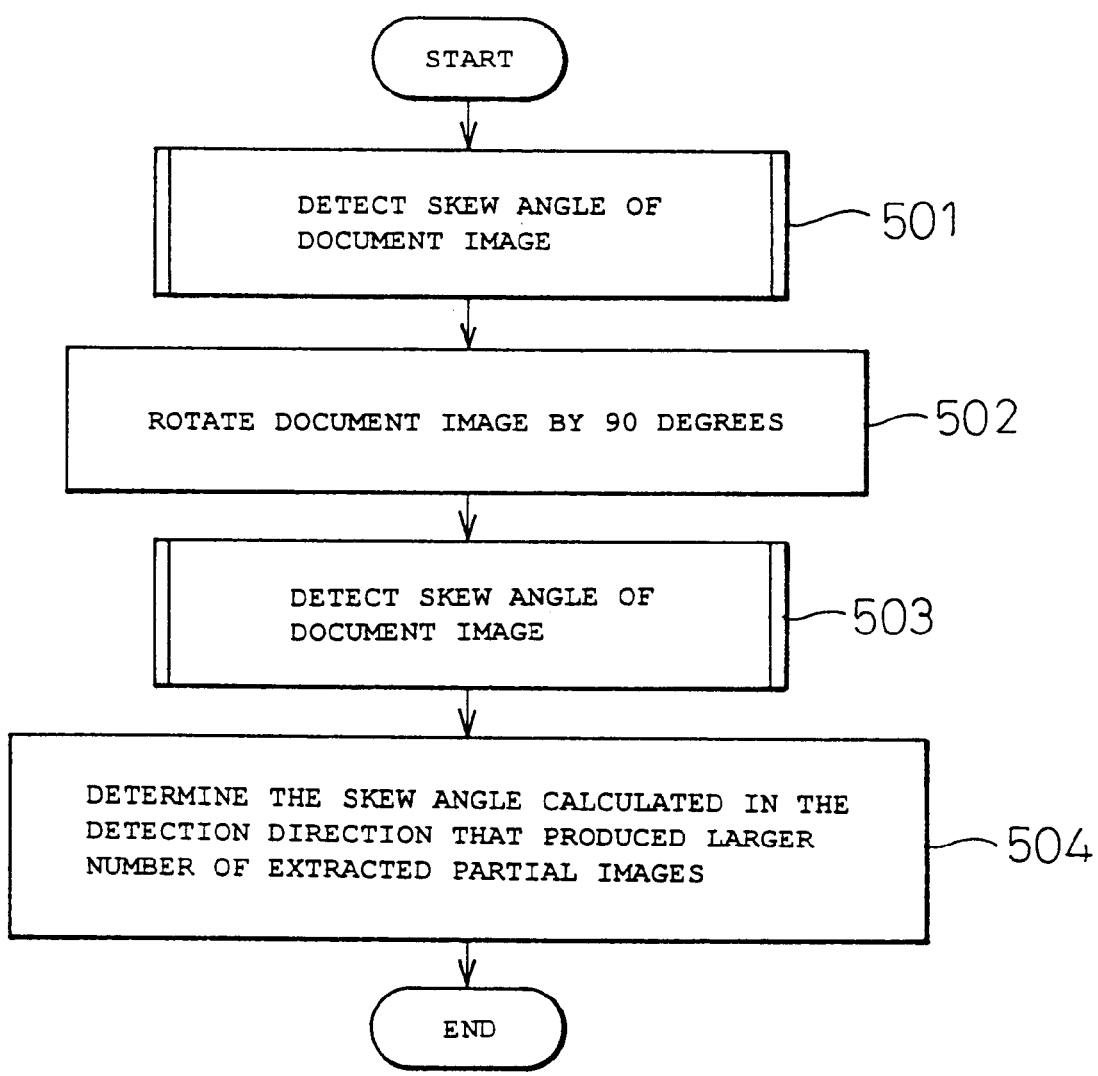
FIG. 12 is a flowchart illustrating a process for detecting document image skews in both horizontal and vertical directions.

FIG. 12 is a flowchart illustrating the process for detecting the skew angle of a document image in both the horizontal and vertical directions.

When the process starts, the skew angle detection for the input document image is performed first in one direction (for example, vertical direction) (step 501). Then, the input document image is rotated by 90 degrees (step 502). Next, skew angle detection is performed for the 90 degrees rotated document image (step 503). If the angle detection is performed in the vertical direction in step 501, then in step 503 the angle detection is performed in the horizontal direction. Here, the processing in steps 501 and 503 is the same as the processing previously described for the document image skew angle detection. Further, in steps 501 and 503, the segmenting direction of the document image is the same.

Then, the horizontal or vertical direction, whichever direction produced the larger number of extracted partial images, is judged to be the correct direction of text orientation, and the skew angle calculated in this direction is determined as representing the text orientation of the document (step There are documents where vertically written text and horizontally written text are mixed on the same page, but in most cases, such documents carry main text written in one direction (for example, horizontal direction) and auxiliary text in another direction (for example, vertical direction), and it would be rare that vertically written text and horizontally written text are contained in approximately the same proportions. Accordingly, in the process shown in FIG. 12, it is expected that more partial images are extracted along one text direction than along the other text direction, and thus the direction of text orientation can be discriminated correctly with high probability.

In the example of FIG. 12, the document image is rotated and the document is segmented along the same direction in both cases, but instead of rotating the document image, in step 503 the document image may be segmented along a direction perpendicular to the segmenting direction employed in step 501.

As described above, according to the present invention, the skew angle of a document image can be detected with high accuracy. In particular, since a plurality of regions considered to contain characters or similar objects are extracted as partial images from the extracted document image, and the skew angle of the document image is determined based on the skew angles, computed for the extracted partial images, the accuracy of the skew angle detection can be further enhanced.

Accordingly, when the document image is input by scanning in a desired direction using a hand-held scanner, the skew of the document image can be automatically corrected and the text straightened by detecting the skew angle of the document image; this greatly contributes to improving the user interface as well as the ease of operation for document image skew correction.

What is claimed is:

1. A method to detect a skew of a document image, comprising:

segmenting an input document image into segmentation regions each having a predetermined width;

detecting a region formed from consecutive lines containing black pixels as a consecutive-line region from within each of said segmentation regions;

extracting said detected consecutive-line region as a partial image based on a predetermined condition;

calculating a skew angle of said partial image; and determining the skew angle of said document image based on said calculated skew angle of said partial image, wherein the determining of the skew angle of said document image comprises:

calculating the angle of a diagonal of said extracted partial image, comparing the angle of said diagonal with the skew angle of said partial image, and determining the skew angle of said document image based on the skew angle of said partial image if the skew angle of said partial image is smaller than the angle of said diagonal.

2. The method as recited in claim 1, wherein the calculating of the skew angle of said partial image comprises:

setting coordinate axes of said partial image, approximating the coordinates of the black pixels present in said partial image by a straight line, and taking the slope of said approximated straight line as the skew angle of said partial image.

3. The method as recited in claim 1, wherein the extracting of said partial image comprises:

calculating the ratio of the number of black pixels to the number of pixels within said consecutive-line region, and extracting said consecutive-line region as said partial image if said number of black pixels lies within a preset range.

4. The method as recited in claim 1, wherein the extracting of said partial image comprises:

determining whether the height of said consecutive-line region lies within a preset height range, and extracting said consecutive-line region as said partial image if it is determined that the height of said consecutive-line region lies within said preset range.

5. A method as recited in claim 1, wherein the extracting of said partial image comprises:

finding a width of an area, in said consecutive-line region where there are no contiguous black pixels along the direction of said lines, comparing the width of said no-black-pixel area with a preset width, and extracting said consecutive-line region as said partial image if the result of said comparison shows that the width of said area is smaller than said preset width.

6. The method as recited in claim 1, wherein the detecting of said consecutive-line region comprises detecting a plurality of consecutive-line regions, the extracting of said partial image comprises extracting a plurality of partial images, the calculating of the skew angle of said partial image comprises calculating the skew angle for each of said plurality of partial images, and the determining of the skew angle of said document image comprises determining the skew angle of said document image based on said calculated skew angles of said plurality of partial images.

7. The method as recited in claim 6, wherein the determining of the skew angle of said document image comprises:

counting skew angle information classified according to the sign of the skew angle calculated for each of said plurality of partial images, and determining the skew angle of said document image based on the skew angle information of whichever sign resulted in a greater count.

8. The method as recited in claim 6, wherein the determining the skew angle of said document image comprises:

obtaining an average value of the skew angles of said plurality of partial images, and determining said average value as the skew angle of said document image.

* * * * *